Oct. 3, 1967
F. G. STEWART ET AL
3,344,935
AIR HOSE MOUNTING SUPPORT
Filed July 30, 1965
5 Sheets-Sheet 2
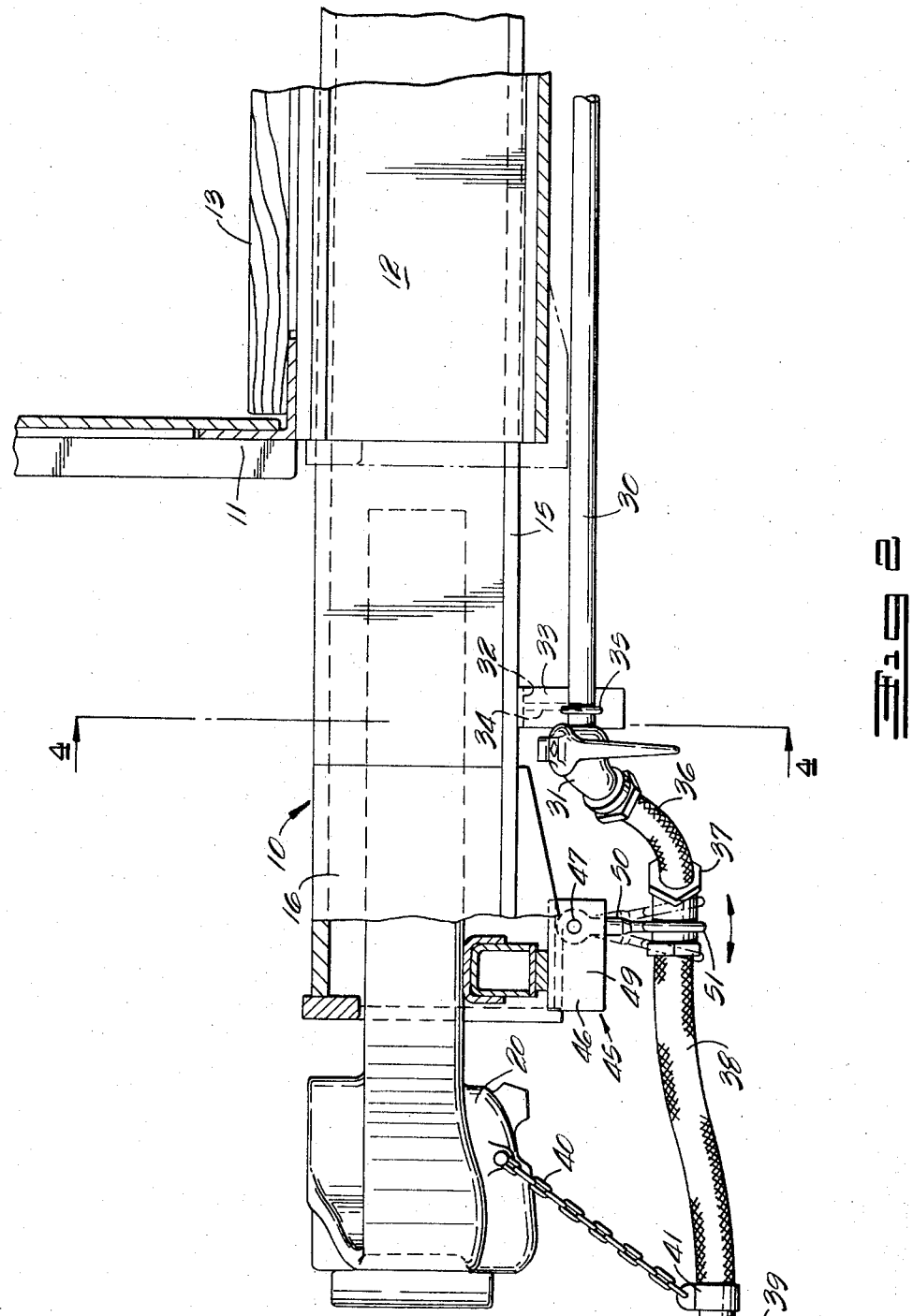
INVENTORS
FREDERICK G. STEWART &
WALTER W. SIMPSON
BY
ATTORNEYS Oct. 3, 1967  F. G. STEWART ETAL  3,344,935
AIR HOSE MOUNTING SUPPORT
Filed July 30, 1965  5 Sheets-Sheet 3
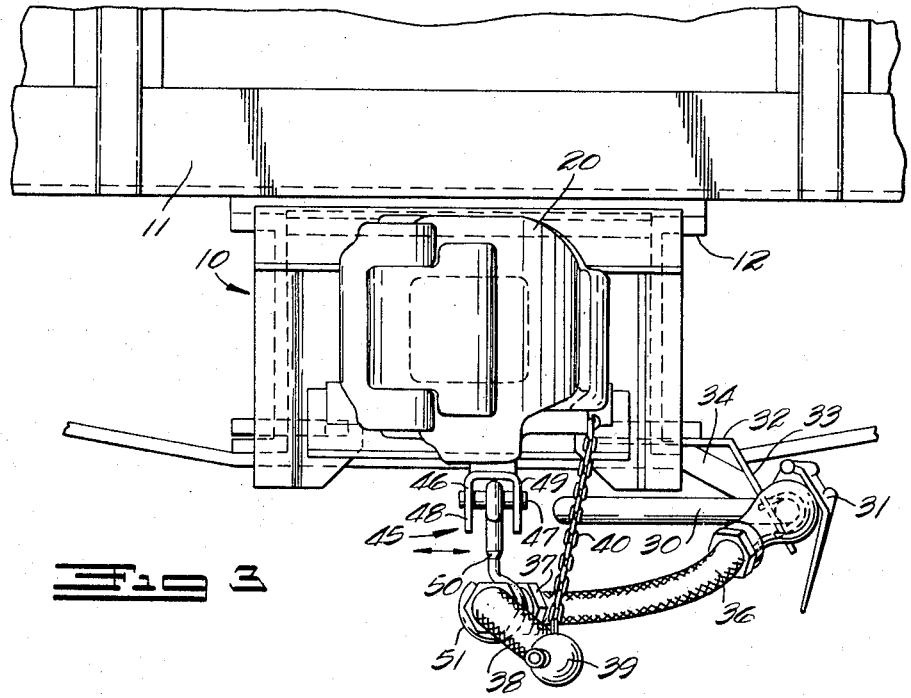
Fig. 3
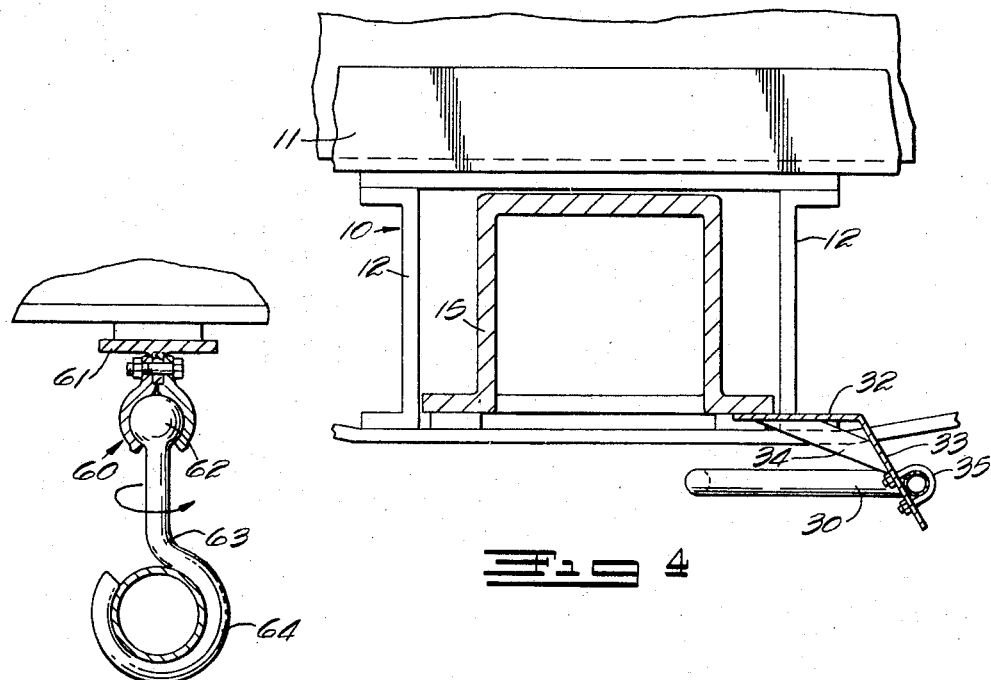
Fig. 4
Fig. 8
INVENTORS
FREDERICK G. STEWART &
WALTER W. SIMPSON
BY
*Fray & Fray*
ATTORNEYS Oct. 3, 1967   F. G. STEWART ETAL   3,344,935
AIR HOSE MOUNTING SUPPORT
Filed July 30, 1965   5 Sheets-Sheet 5
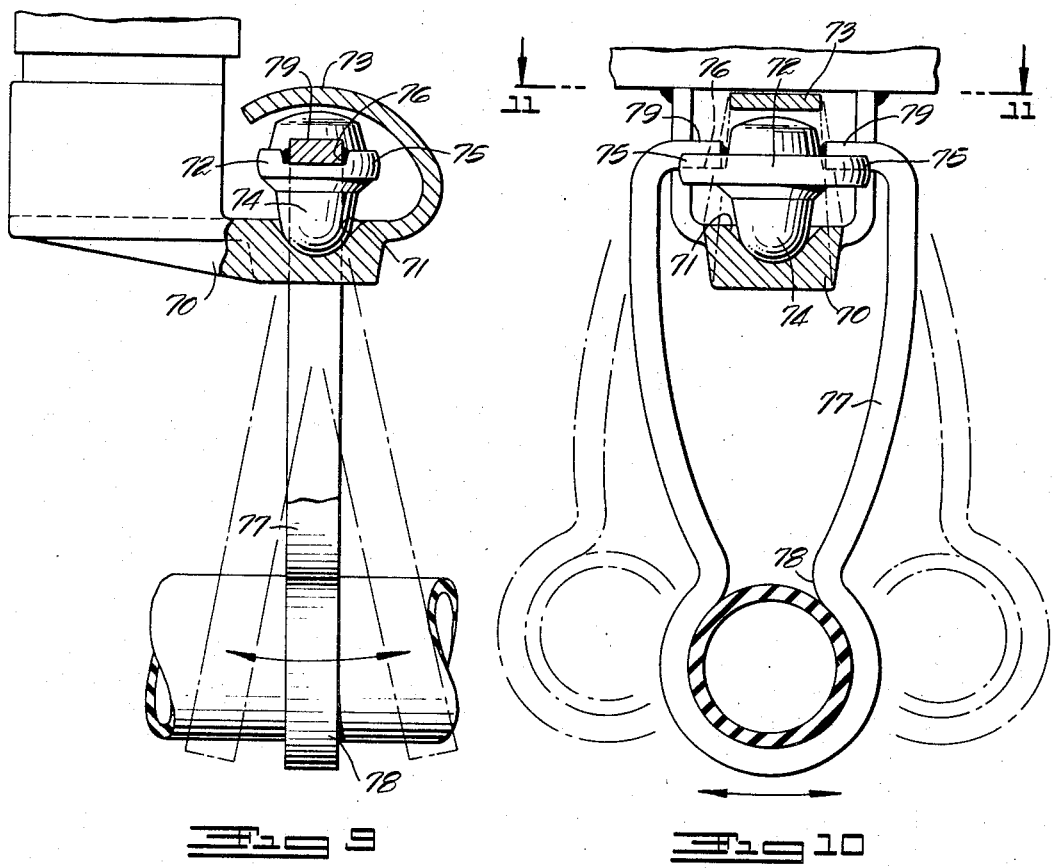
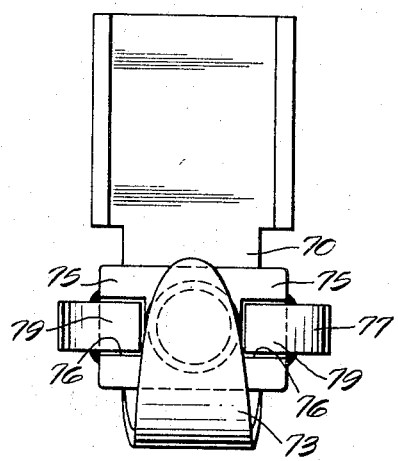
INVENTORS
FREDERICK G. STEWART &
WALTER W. SIMPSON
BY
*Fay & Fay*
ATTORNEYS United States Patent Office 3,344,935
Patented Oct. 3, 1967

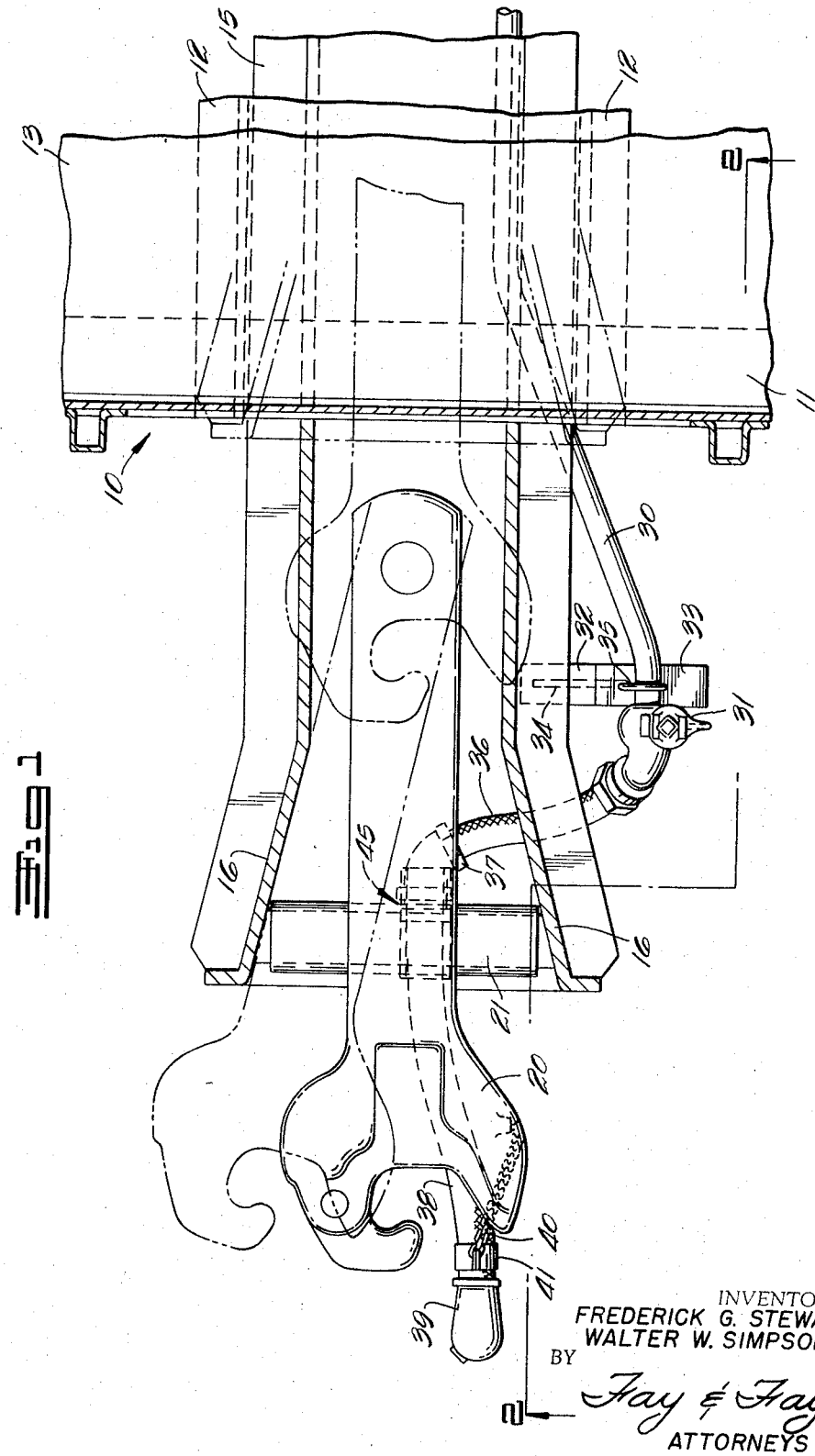

3,344,935
AIR HOSE MOUNTING SUPPORT
Frederick G. Stewart, 3039 Macomb St. NW., Washington, D.C. 20008, and Walter W. Simpson, 3050 N. 38th St., Arlington, Va. 22207
Filed July 30, 1965, Ser. No. 476,072
4 Claims. (Cl. 213—1)

ABSTRACT OF THE DISCLOSURE

An air line support means for a railway car with an angle cock is connected to the air line and attached to the railway car. The support means has a supporting bracket secured to the car adjacent the coupler and on which a pivot means is supported for longitudinal and transverse movement of the car with the air hose supported on the pivot means.

This invention relates to the mounting of air hoses on a railroad car and more particularly to an improved bracket for mounting the air hoses whereby the air hose is movably supported on the car.

The mounting of the air hoses on a railroad car has presented a problem to the railroad industry for many years. This has been particularly true with the advent of the long travel cushioned underframe car and the greater arc described by the coupler as the car negotiated a curve. As compensation for the greater movement of the coupler in a cushioned underframe car, it was necessary to relocate the air hose supports so that the air hose would not be pulled apart. One proposed solution to this problem was to mount the angle cock on the coupler itself so that the angle cock would swing with the coupler and a flexible hose connection was provided between the angle cock and the train line. However, a serious difficulty was experienced with this arrangement in that mismatched couplers often caused breakage of the angle cock.

An alternative solution was to mount the angle cock on the frame of the car independent of the coupler. However, the length of air hose to be employed on a railroad car is fixed by American Association of Railroads standards and it was therefore necessary to position the angle cock so that a sufficient length of air hose was available to compensate for the greatest possible arc described by the couplers. In such circumstances, the air hose, when connected to a car on straight track, had a tendency to kink due to the excessive amount of hose available as compensation. The kinking in the hose tended to restrict the flow of air through the air hose and was a source of considerable problems. Another alternative was to mount the angle cock so that there was no kinking of the hose during the straight travel of the cars. However, in such circumstances, there was an inadequate amount of hose available as compensation when a curve was negotiated and, as a consequence, the air hoses would tend to pull apart.

It is an object of this invention to provide a support for the air hose which avoids any kinking of the hose and also provides adequate compensation for the swinging of the couplers through an arc while the train traverses a curve.

It is a further object of this invention to provide a support for the air hose, which support is movably mounted on the frame of the railroad car independent of the coupler.

More specifically, an object of this invention is to provide a support for an air hose in which the support permits movement of the hose longitudinally of the axis of the railroad car.

It is a still further object of this invention to provide a railroad car in which the air hose is carried by a support, with the support being mounted on the frame of the car for movement both longitudinally and transversely of the axis of the car while simultaneously permitting angular rotation of the air hose relative to the support.

The above objects, as well as others which will become more apparent upon a complete reading of the following description, are accomplished by a railroad car in which a coupler is supported from the frame of the car for swinging movement transversely of the car. An angle cock is secured to a bracket on the car with a flexible hose leading from the angle cock to an air hose support mounted on the car. The air hose support includes a pivot pin which has its longitudinal axis extending transversely of the car. Supported on the pin is an eye bolt which is capable of pivoting movement longitudinally of the car and sliding movement longitudinally of the pin. Extending through the eye of the bolt is the air hose, with the hose being supported in the eye of the bolt for rotation relative to the bolt.

Other objects and features will become more apparent upon a complete reading of the following description which sets forth in detail but a few approved means of carrying out the invention. Such disclosed means are not meant to be limiting inasmuch as they constitute but a few of the various ways in which the principles of the invention may be applied.

In the drawings wherein like reference numerals indicate like parts in the various views:

FIG. 1 is a plan view illustrating a coupler as it is secured to a portion of a railroad car together with the improved air hose support comprising the instant invention;

FIG. 2 is a side elevation view taken along lines 2—2 of FIG. 1;

FIG. 3 is a view taken along lines 3—3 of FIG. 2 and shows in end elevation the improved air hose support as it is positioned on the car;

FIG. 4 is a view taken along lines 4—4 of FIG. 2;

FIG. 8 is an illustration of a modified form of the air hose support;

FIGS. 9–11 illustrate a further modification of the air hose support.

Figure 5:
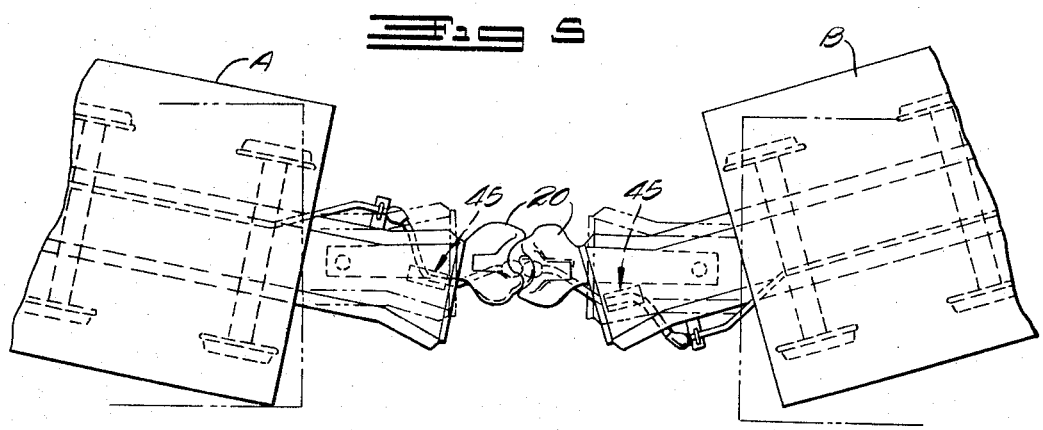
FIG. 5 illustrates schematically in plan view the relative position of the air hoses and couplers as adjacent cars negotiate a curve.

Referring to the drawings and particularly FIG. 1 thereof, there is illustrated a portion of a cushioned underframe railway car indicated generally by the reference numeral 10. Although various types of cushioned underframe cars have been devised, the specific structure of such a car is immaterial to the principles of this invention and the specific design illustrated is only for purposes of facilitating disclosure. Moreover, although the instant invention is particularly useful in a cushioned underframe car, in fact, the invention might as readily be used in a conventional railroad car.

The car comprises an underframe made up of an end sill 11, center sills 12 and side sills, not shown. A floor 13 is also partially illustrated with the remaining structure of the car being omitted. In addition, a draft and buffing column 15 is illustrated in position between the center sills 12, which column terminates in outwardly flared flanges 16. A more complete disclosure of a typical cushioned underframe construction is illustrated in the U.S. Patent No. 3,043,223 to Austgen, issued July 3, 1962. A coupler 20 is connected to a draft gear through a yoke arrangement in a manner which will be readily apparent to those having ordinary skill in the art. The coupler extends outwardly of the end of the draft column 15 in the manner illustrated in FIG. 1 and is adapted to pivot through an arc on either side of the center line of the car. A striker plate 21 is provided in conventional manner.

A portion of a trainline 30 is illustrated in FIG. 1. The trainline terminates in the conventional angle cock 31 which is supported on the draft column 15 by a bracket 32. This is best viewed in FIGS. 3 and 4. The bracket 32 includes an angularly depending leg 33 with a brace member 34 extending between the two legs. A U-bolt 35 clamps the rigid conduit of the trainline to the bracket 32 so that as the draft column 15 absorbs the impacts in the manner contemplated, the trainline 30 will also accommodate this movement. If the principles of this invention are employed in a conventional car, it is contemplated that the bracket 32 and angle cock 31 would be secured to the end sill.

Connected at one end to the angle cock 31 is a flexible hose 36. An angle fitting 37, a 60° angle fitting in the illustrated embodiment, is connected to the other end of the hose 36. A second flexible hose 38 has one end secured to the angle fitting 37 and the other end of the hose has a conventional releasable coupling 39. A conventional chain 40 is secured by a clip 41 to one end of the hose 38 with the other end of the chain 40 being attached to the coupler 20 thereby providing support for the hose 38 and preventing the hose from dragging on the ground when the hose 38 is not connected to the corresponding hose on an adjacent vehicle.

The hose 38 is a subject of standardization by the American Association of Railroads with a standard length of hose being specified for all types of cars. In such circumstances, the greater pivoting arc described by the coupler 20 in a cushioned underframe car requires that the hose 38 compensate for the greater arc in some manner. This is accomplished in the instant application by the provision of a support bracket, indicated generally by the reference numeral 45. This support bracket includes a U-shaped channel member 46 which is secured with its longitudinal channel parallel with the longitudinal axis of the railroad car. A pivot pin 47 is supported by the depending legs 48, 49 of the channel 46, with the longitudinal axis of the pin 47 being transverse to the longitudinal axes of the car and the channel 46. The channel 46 may be suspended below the coupler on the draft column or, in the event of a standard railroad car, may be secured to the end sill of the frame at an appropriate point below the coupler 20. In either circumstance, the positioning of the channel 46 below the coupler provides an optimum length of hose for connection with the adjacent vehicle as will hereinafter be more apparent.

The pin 47 serves as a pivot for an eye bolt 50. The bolt 50 includes a substantially circular eye 51 in which is received the angle fitting 37. It is contemplated that the dimensions of the eye 51 relative to the dimensions of the angle fitting 37 will be such that the angle fitting will be permitted rotational movement relative to the eye bolt 50. It is also to be noted that the longitudinal extent of the pin 47 and the spacing of the depending legs 48, 49 on the channel 46 are such that the bolt 50 is permitted a transverse sliding movement relative to the bracket 46. In such circumstances, it is apparent that movement of the hose 38 is available in a multiplicity of directions. First, by pivoting movement of the bolt 50 relative to the pin 47, the hose 38 may be moved longitudinally of the railroad car. By sliding movement of the bolt 50 on the pin 47, a transverse movement of the hose 38 is also available. Finally, by rotation of the angle fitting 37 in the eye 51 of the bolt 50, an angular accommodation of the hose 38 is also permitted.

Figure 6:
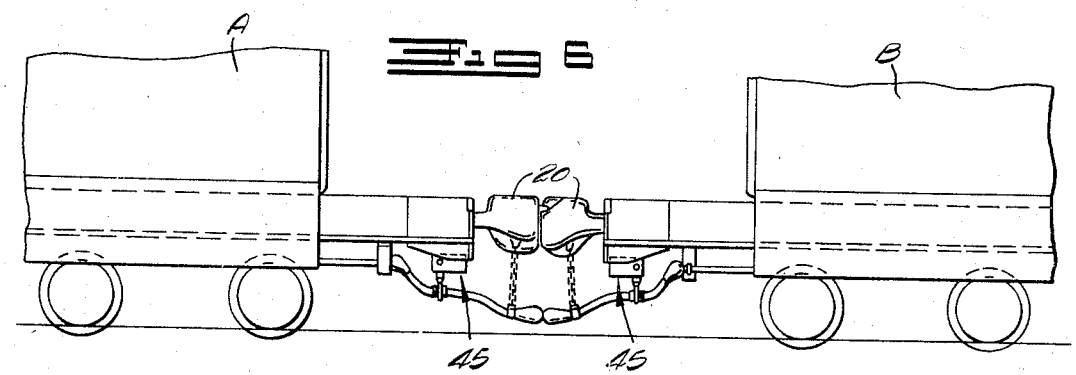
FIG. 6 illustrates schematically the positions of the hoses and the hose supports with the cars on straight track.
Figure 7:
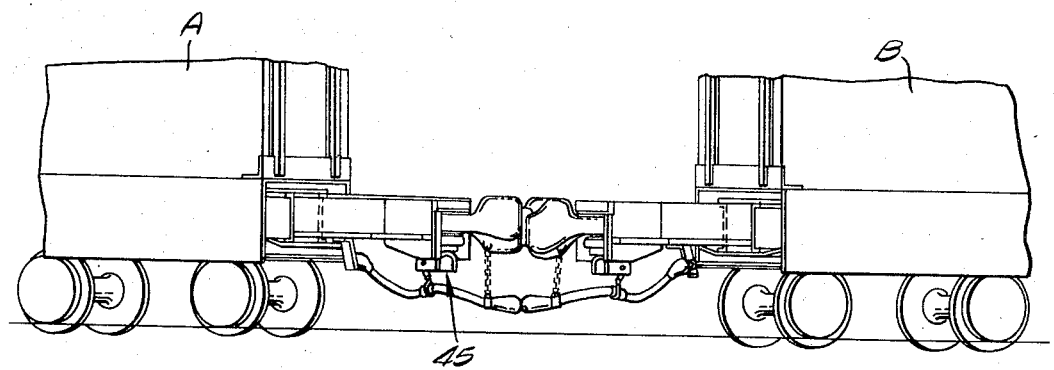
FIG. 7 is a view similar to FIG. 5 and illustrates in side elevation the position of the hoses and supports as the cars negotiate a curve.

With the above described support for the air hose, a desirable relationship between adjacent cars is obtained. Thus, referring first to FIG. 6, with two railroad cars A and B on straight track, the couplers may be connected and the two air hoses may also be connected as shown in that figure. With the position of the hoses on the draft column, any tendency to have an excess amount of hose in this position of the cars will not result in the kinking of the hoses 38 in the manner heretofore encountered. Thus, if an excess amount of hose is present when the cars are coupled together, the eye bolt 50 on one or both of the cars may pivot on the pin 47 toward the rear of the car and thereby take up any slack in the hose. Moreover, when the cars are negotiating a curve, as illustrated in FIGS. 5 and 7, the couplers are swinging through an arc, it will be understood that additional hose must be available to avoid pulling the hoses apart. In such circumstances, the eye bolts 50 may pivot on the pins 47 forwardly of the cars, as, for example, shown in FIG. 7, and thereby accommodate the changed conditions. Additional hose length may also be provided by the sliding of the bolts 50 longitudinally of the pins 47. Thus, assuming the cars to be negotiating the curve as shown in FIG. 7, the bolt 50 on car B might slide on the pin 47 toward the inside of the curve while simultaneously the bolt 50 on the pin 47 of car A would slide toward the outside of the curve and thereby provide an additional length of hose.

In addition to the compensating features of the support, it is also to be noted that the construction hereinabove described also facilitates the coupling of the cars. Thus, the multiplicity of movements available to the air hose makes it easier for the workman to align and connect the hoses either on a curve or on the straight track. An additional desirable factor is the complete removal of the angle cock 30 from the proximity of the couplers so that even in the event of mismatched couplers, there is virtually no possibility that the angle cock will be struck and damaged.

Referring to the modification shown in FIG. 8, a result similar to that above described is obtained. Thus, in lieu of the sliding and pivoting eye bolt, there is provided a ball and socket arrangement. The socket is designated as 60 in FIG. 8 and is supported on a bracket 61 which may be attached to the car in the same manner and position as was bracket 46. The socket 60 receives a ball 62 on the end of an eye bolt 63 so that the eye bolt may swing in any direction about the socket 60 as a pivot point. The angle fitting 37 would be received in the eye 64 of the bolt 63 and thereby provide the same movements for the hose 38 as those above described.

Referring to the embodiment of FIGS. 9–11, there is illustrated a pivot support 70 which may be attached to the car in the manner of the previous embodiments. The pivot support includes a socket or depression 71 in which there is received a pivot pin 72. The support 70 includes an upwardly curved retaining flange 73 which assures the retention of the pivot pin in the socket. The pivot pin includes a semispherical portion 74 and radially outwardly extending support flanges 75. Each of these flanges includes a recess 76, which recesses extend radially inwardly across the surface of the flanges 75 to the central portion of the pivot pin 72.

A generally U-shaped brace 77 having a cylindrical portion 78 at the closed end thereof is adapted to receive the angle fitting 37 in the manner above described. The brace 77 includes spaced apart legs with each leg having an inwardly bent terminal end 79. These ends are designed to be received in the recesses 76 to provide a pivoting support for the bracket. Weld material or other means may be used to secure the ends 79 in the recesses. With this arrangement, it is readily apparent that the same above described freedom of movement is provided for the hose thereby eliminating the possibility of kinking of the hose and also rendering the hoses more easily coupled.

It is believed apparent that with the hereinabove described structure each of the objects set forth above have been accomplished. Modifications and changes will suggest themselves to those having ordinary skill in the art. Changes such as these are contemplated by the principles of this invention so that although for ease of description, the principles of the invention have been set forth in connection with but a few illustrated embodiments, it is not intended that the illustrated embodiments or the terminology employed in describing them is to be limiting; but rather, it is our desire to be restricted only by the scope of the appended claims.

We claim:

1. In a railway car having a coupler with a coupler head supported thereon for swinging movement relative to the longitudinal center line of the car, an air line supported for longitudinal and transverse movement on the car, an angle cock attached to the car frame independent of the coupler and connected to the air line, and an air hose having one end connected to the angle cock and the other connected to an angle fitting, the improvement comprising:
   a supporting bracket secured to the car adjacent the coupler;
   said supporting bracket including a fixed pin having a longitudinal axis extending transverse of the axis of the car;
   a bolt supported on said pin for pivoting movement longitudinally of said car, said bolt having a width substantially smaller than the length of said pin so that said bolt may slide transverse to the axis of the railway car;
   said bolt including a support eye through which said angle fitting is received, said support eye having an inside diameter larger than the outside diameter of said angle fitting so that said angle fitting may rotate freely in said support eye.

2. In a railway car having a coupler with a coupler head supported thereon for swinging movement transversely of the center line of the car, a trainline on the car, an angle cock supported on the car frame independent of the coupler and connected to the trainline and an air hose having one end connected to the angle cock and the other end connected to an angle fitting, the improvement comprising:
   a bracket means secured on said car intermediate the coupler head and the angle cock;
   pivot means;
   said pivot means including a portion receiving said angle fitting for support thereof;
   means on said bracket means supporting said pivot means for movement rotationally longitudinally and transversely of said car, said support means on said bracket including a socket; and
   said pivot means includes a pivot ball in said socket.

3. The combination of claim 2 wherein said pivot ball in said socket protrudes thereabove and permits angular rotation of said air hose relative to said socket.

4. The combination of claim 2 wherein said pivot ball is formed at one end of said pivot means and depends from a socket which supports said pivot ball.

References Cited
UNITED STATES PATENTS

| | | | |
|---|---|---|---|
| 535,094 | 3/1895 | Edwards | 248—62 |
| 840,337 | 1/1907 | Johnson | 248—62 X |
| 1,263,520 | 4/1918 | Brown | 213—1.3 |
| 1,797,167 | 3/1931 | Baldwin | 213—76 |
| 1,987,868 | 1/1935 | Petznick | 213—76 |
| 2,321,434 | 6/1943 | Stenzel et al. | 248—53 |
| 2,996,315 | 8/1961 | Roth et al. | 248—53 X |
| 3,042,223 | 7/1962 | Austgen | 213—1 |

ARTHUR L. LA POINT, *Primary Examiner.*

DRAYTON E. HOFFMAN, *Examiner.*